(12) United States Patent
Kroef

(10) Patent No.: US 12,275,596 B2
(45) Date of Patent: Apr. 15, 2025

(54) ALIGNMENT CONVEYOR

(71) Applicant: PIP INNOVATIONS B.V., Bergen (NL)

(72) Inventor: Bart Kroef, Bergen (NL)

(73) Assignee: PIP INNOVATIONS B.V., Bergen (NL)

( * ) Notice: Subject to any disclaimer, the term of this patent is extended or adjusted under 35 U.S.C. 154(b) by 0 days.

(21) Appl. No.: 18/287,268

(22) PCT Filed: Apr. 19, 2022

(86) PCT No.: PCT/EP2022/060290
§ 371 (c)(1),
(2) Date: Oct. 17, 2023

(87) PCT Pub. No.: WO2022/223546
PCT Pub. Date: Oct. 27, 2022

(65) Prior Publication Data
US 2024/0199343 A1 Jun. 20, 2024

(30) Foreign Application Priority Data
Apr. 19, 2021 (EP) .................. 21169219

(51) Int. Cl.
*B26D 1/28* (2006.01)
*B26D 5/20* (2006.01)
(Continued)

(52) U.S. Cl.
CPC ........... *B65G 41/007* (2013.01); *B65G 27/18* (2013.01); *B65G 41/005* (2013.01); *B65G 53/30* (2013.01);
(Continued)

(58) Field of Classification Search
CPC ... B26D 5/20; B26D 7/06; B26D 1/28; B65G 27/00; B65G 27/16; B65G 27/18;
(Continued)

(56) References Cited

U.S. PATENT DOCUMENTS 2,877,846 A * 3/1959 Tobey ............... B26D 5/34
83/365
4,576,071 A * 3/1986 Rayment .......... B26D 5/32
83/365

(Continued)

FOREIGN PATENT DOCUMENTS

EP 0 191 581 A2 8/1986
EP 2 878 203 A1 6/2015
(Continued)

OTHER PUBLICATIONS

Jul. 22, 2022 International Search Report issued in International Patent Application No. PCT/EP2022/060290.
(Continued)

*Primary Examiner* — Douglas A Hess
(74) *Attorney, Agent, or Firm* — Oliff PLC

(57) ABSTRACT

A passive alignment conveyor suitable for elongated bodies including at least one piece of material including an indentation in an alignment direction as an alignment lane, which alignment lane includes at least one slot in the alignment lane in an angle to the alignment direction, at least one means for optical detection, at least one electronic circuit-based control device, wherein least one movable knife mounted shifted from the means for optical detection in the alignment direction, mounted in an angle to the alignment direction and mounted in such a way that it can move within the slot in the alignment lane.

15 Claims, 4 Drawing Sheets

(51) Int. Cl.
  *B26D 7/06* (2006.01)
  *B65G 27/00* (2006.01)
  *B65G 27/16* (2006.01)
  *B65G 27/18* (2006.01)
  *B65G 41/00* (2006.01)
  *B65G 53/30* (2006.01)
  *B65G 21/12* (2006.01)

(52) U.S. Cl.
  CPC ...... *B65G 21/12* (2013.01); *B65G 2201/0211* (2013.01); *B65G 2203/044* (2013.01)

(58) Field of Classification Search
  CPC .... B65G 41/005; B65G 41/007; B65G 53/20; B65G 2201/0211
  USPC .......................................................... 99/537
  See application file for complete search history.

(56) References Cited

U.S. PATENT DOCUMENTS

| | | | | |
|---|---|---|---|---|
| 7,430,947 B2 * | 10/2008 | Julian | ...................... | B26D 1/26 83/932 |
| 8,616,099 B2 * | 12/2013 | Hallvardsson | ......... | A22C 17/02 83/13 |
| 8,893,599 B2 * | 11/2014 | Reifenhaeuser | ......... | B26D 7/32 83/29 |
| 9,399,531 B2 * | 7/2016 | Pryor | ...................... | B26D 7/325 |
| 10,086,525 B2 * | 10/2018 | Engel-Hall | ......... | A47J 37/0864 |
| 10,245,742 B2 * | 4/2019 | Foreman | ............... | B26D 7/0625 |
| 10,632,637 B2 * | 4/2020 | Rother | ...................... | B26D 5/20 |
| 10,654,185 B2 * | 5/2020 | Blaine | ...................... | B26D 7/30 |
| 11,751,598 B2 * | 9/2023 | Dragt | ...................... | B26D 5/30 99/539 |
| 2005/0279228 A1 | 12/2005 | Julian et al. | | |

FOREIGN PATENT DOCUMENTS

| | | | |
|---|---|---|---|
| GB | 2519792 A | | 5/2015 |
| WO | 2004/034794 A1 | | 4/2004 |
| WO | 2004/106020 A1 | | 12/2004 |
| WO | 2016/083622 A1 | | 6/2016 |
| WO | WO-2020070174 A1 | * | 4/2020 |

OTHER PUBLICATIONS

Jul. 22, 2022 Written Opinion issued in International Patent Application No. PCT/EP2022/060290.

Aug. 14, 2023 International Preliminary Report on Patentability issued in International Patent Application No. PCT/EP2022/060290.

* cited by examiner

ALIGNMENT CONVEYOR

The invention pertains to an alignment conveyor that can be used for cutting elongated bodies.

Deep-fried potato strips known as chips, French fries or freedom fries have become an important convenience food during the 20$^{th}$ century especially as using proper equipment large amounts of them can be brought from frozen to edible form within a few minutes making them ideal street food.

The large demand for French fries has made French fry production an industry branch with production rates of up to a hundred tons per hour in large-scale factories.

French fries are made from potatoes which are optionally peeled and afterwards cut into strips by pressing through grid-shaped knifes to obtain potato strips.

During the processing to French fries the potato strips are pre-fried, frozen and packed.

In industrial processing, requirements on the quality of the French fries are high and defects in the French fries such as black spots which from time to time occur in potatoes are absolutely undesired.

The easiest and most intuitive way to provide French fries without defects may be to sort out any potato strip with a defect. However, this method produces a large amount of discard which still may be used as animal food or for producing alcohol, however it significantly reduces efficiency of French fry production and also may lead to ethical problems due to waste of food.

In order to reduce the amount of discard in French fry production machines have been developed which automatically identify defects in potato strips and selectively cut the potato strip apart such that the defect is removed and two shorter defect free potato strips are obtained. Use of such machines significantly reduces the amount of discard during French fry production. However, the machines known in the art today have several disadvantages as they suffer from high technical complexity and large demand of space.

International patent applications WO2004/034794 and WO2004/106020 describe machines for conveying and portioning of pieces of fish and meat using arrays of conveyor belts, optical inspection and rotatory knifes controlled using the results of optical inspection. However, these devices are designed for cutting comparably large items and comprise a large amount of movable items resulting in a high complexity which makes it uneconomical to use such devices for processing small items like French fries which have to be processed in large amounts.

It is thus the object of the invention to provide a machine for automatic removal of defects from potato strips which is compact, technically simple and which can furthermore easily be adapted in its size depending on the desired throughput rate. The problem is surprisingly solved by a passive alignment conveyor suitable for elongated bodies comprising at least one piece of material comprising an indentation in an alignment direction as an alignment lane, which alignment lane comprises at least one slot in the alignment lane in an angle to the alignment direction, at least one means for optical detection, at least one electronic circuit-based control device, characterized in at least one movable knife mounted shifted from the means for optical detection in the alignment direction, mounted in an angle to the alignment direction and mounted in such a way that it can move within the slot in the alignment lane.

According to the present application, an elongated body is any item that has a length that is at least three times as large as its largest diameter. The length of the elongated body according to the present application is practically unlimited, however the typical lengths will vary between 2 and 50 centimeters. Possible elongated bodies the alignment conveyor according to the application should be suitable for are e.g. French fries or potato strips which may be processed to French fries, strips, cuts or whole pieces of other vegetables or fruits such as carrots, zucchini, aubergines, cucumbers, asparagus, leek, beans, parsnips, bananas or salsify roots.

A French fry according to the pending application is any elongated body cut from a potato independent whether it is peeled or unpeeled, raw, blanched, cooked, deep fried, frozen or in any other state of processing.

Throughout this application, the term "potato" is generally used for any starch-containing plant tubers which are used as human or animal food. In particular, a potato according to this application is a tuber of the common potato, *Solanum tuberosum* or any cultivars of this biological species. However, the term "potato" can also mean the tuber of the sweet potato, *Ipomoea batatas* or any other plant. According to the present application, a conveyor is a device on which items are transported without the conveyor itself carrying out any translatory movement. A conveyor according to the present application may thus be called a "passive conveyor". Throughout this application, the terms "conveyor" and "passive conveyor" are used synonymously. Conveyors or passive conveyors according to the present application thus have to be distinguished from active conveyors which transport items by an own movement which are most familiar in the form of conveyor belts.

If not mentioned otherwise, throughout this application, the term "conveyor" means a passive conveyor as described above although it may not always be called "passive".

A passive conveyor may thus be a vibrating or shaking device which transports items by bringing them to a move by themselves or a smooth and planar sloped surface on which the items slide or any combination thereof.

Movement of the elongated bodies along the alignment lanes may also be induced by a flow of water or pressurized air within the alignment lane.

When using a water flow, water is running through the sloped alignment lanes and transports elongated bodies along the alignment lane. The speed of water flow may be controlled by the angle of the slope of the alignment lane, the amount of water flowing through the alignment lane and the pressure of water flowing through the alignment lane and any combination thereof.

In case water is used to transport elongated bodies through a sloped alignment lane, the alignment lane should comprise a water outlet such as a tab or a nozzle at or close to its top end and a drainage connected to its bottom end. Said drainage may comprise a selection unit to separate the elongated bodies from the water.

After having passed the alignment lanes, the water may either be drained as wastewater or be recycled. In the latter case, at least one water pump is necessary to pump the water back to the top end of the alignment lane. The pump may be combined with means for water treatment such as filters or devices to disinfect the water by short heating, UV, X-ray or gamma radiation or by applying chemical desinfectants such as ozone, chlorine dioxide, any other chlorine compound, peroxides such as hydrogen peroxide or dimethyldicarbonate.

In processing of French fries, the water will accumulate starch which is washed from the French fries and which may be separated from the water and be used for any known purposes.

In the processing of French Fries, it may be desirable to keep the water free or at least low on oxygen in order to make sure that the raw potato pieces do not change their color. In such cases addition of organic or inorganic reductants such as aldehydes, formic acid, thiosulfates or sulfites may be necessary.

An alignment conveyor is a conveyor which transports items in a predefined orientation and which is also able to bring items into a predefined orientation which is called alignment direction. In an embodiment, the predefined orientation is the orientation parallel to the direction to which the items are transported.

In order to bring items into a predefined orientation, an alignment conveyor has a three-dimensional structure comprising indentations and/or a surface relief in an alignment direction as alignment lanes. The alignment lanes may be channels which are shaped such that items have to pass each line as a single row. The alignment lanes may be open an the top or they may comprise an encasing such that they are covered or closed to the top. The alignment lanes may thus also be covered channels or pipes. In an embodiment, the pipes or the encasing may be transparent to allow for optical inspection. In an embodiment, the alignment lanes may be profiled pieces of sheet metal or blocks of rigid material comprising indentations forming the alignment lanes. The alignment lanes may also be formed by combining one or more profiled pieces of sheet metal with one or more blocks of rigid material comprising indentations. In order to align the items, the alignment conveyor may further comprise any means for alignment such as shakers, bars or funnel-shaped inlets or combinations thereof which are installed before the alignment lanes and make sure that the items have proper orientation before they enter the alignment lanes. For rough alignment of the elongated bodies before entering the alignment conveyer according to the invention, the alignment conveyor may be combined with an inline shaker, a device which comprises a conveyor which can be shaken in such a way that elongated bodies deposited thereon align along the movement direction.

The slot may be positioned anywhere in the alignment lane. In an embodiment, the slot is positioned in the sidewalls of the alignment lane. In an embodiment, the slot is positioned at the bottom of the alignment lane.

The slot may form an angle between 90 and 10 degrees with the alignment direction. The slot may form an angle between 90 and 10 degrees with the bottom of the alignment lane. The choice of the precise angle and positioning of the slot may be oriented on issues of construction of the alignment conveyor.

In an embodiment, the slot is formed at the border of two elements. Said two elements may be two blocks of rigid material comprising indentations, two pieces of profiled sheet metal or a combination thereof.

In embodiments of the alignment conveyer where water flow is used to transport elongated bodies through the alignment lanes, the slot may be formed like a step which is passed by the water flow like a weir is passed by a creek or a river in order to make sure that the water is not draining through the slot. Passage of the water flow over the step may be optimized by influencing the water flow to avoid loss of water. The water flow may be adjusted by the geometry of the alignment lane over the step which may contribute to formation of a homogeneous and compact flow. The geometry of the corner of the step may also be optimized to avoid loss of water by dripping by formation of sharp edges or geometries similar to the spout of a tea or coffee pot. Finally, the water flow may be optimized by the surface properties of the upper part of the step. Hydrophobic materials such as polytetrafluoroethylene (PTFE), silicone, polyvinylchloride, polyolefins such as polyethylene or polypropylene or polycarbonate allow for formation of a compact and homogeneous flow which furthermore smoothly and completely separates from the material. Apart from the choice of the bulk material, the hydrophobicity effect may also be achieved by hydrophobic coatings.

The lower part of the slot being formed like a step may be formed and/or treated in a manner that splashing of water is avoided when the water flow alone or the water flow together with elongated bodies and/or parts thereof is hitting the lower part of the slot. Splashing may e.g. be avoided by use of hydrophilic materials and/or coatings or of an inclination of the lower part of the slot which assures that the water flow hits the lower part of the slot in a grazing manner.

The rate of the water flow running down one alignment lane may be at least 100 liters per hour (l/h). In an embodiment, the waterflow may be at least 200 l/h, 250 l/h, 300 l/h or 400 l/h.

The rate of the water flow running down one alignment lane may be at most 150 l/h, 250 l/h, 300 l/h, 400 l/h or 500 l/h. However, when water is recycled, the amount of water necessary to run an alignment lane may be 20, 30, 40 or 50 liters in total with about 10-20% having to be replaced per hour.

The alignment conveyor may comprise a means to vibrate the at least one alignment lane. The means to vibrate may be a magnetic shaking device, a motor connected to an imbalanced weight or a horizontal shaker. In an embodiment, the means to vibrate allow for both a horizontal and a vertical movement. In an embodiment, the strength of the vibration induced by the means to vibrate is adjustable. In an embodiment, the minimum vibration rate of the vibration means is 10 Hz. In an embodiment, the minimum vibration rate is 20 Hz. In an embodiment, the minimum vibration rate is 30 Hz.

The maximum vibration rate may be 500 Hz. In an embodiment, the maximum vibration rate may be 150 Hz. In an embodiment, the maximum vibration rate may be 100 Hz.

The maximum vibration amplitude is 15 mm. In an embodiment, the maximum vibration amplitude is 10 mm. In an embodiment, the maximum vibration amplitude is 5 mm. In an embodiment, the maximum vibration amplitude is 3 mm.

The minimum vibration amplitude is 0.5 mm. In an embodiment, the minimum vibration amplitude is 0.7 mm. In an embodiment, the minimum vibration amplitude is 0.9 mm. Vibration may be carried out in the alignment direction, perpendicular to the alignment direction or in any angle there between. Vibration may also be carried out in several directions.

Vibration may be combined with other techniques to induce movement of the elongated body along the alignment lane. In an embodiment, vibration of the alignment lane may be combined with a water flow running down the alignment lane.

The alignment lanes are made of a rigid material. A rigid material according to the application is a material which has a Young's modulus of 0.1 GPa or more. In an embodiment, the material has a Young's modulus of 0.2 GPa or more. In an embodiment, the material has a Young's modulus of 0.3 GPa or more. In an embodiment, the material has a Young's modulus of 0.4 GPa or more. In an embodiment, the material has a Young's modulus of 0.5 GPa or more.

In an embodiment, the alignment lanes are made of or covered by a non-reflective material. A non-reflective material is any material which shows a specular reflection that is negligible compared to its diffuse reflection.

In an embodiment, the alignment lanes are of a material that is translucent, semi-transparent or transparent. Possible materials therefore are organic polymers such as polyolefins such as polyethylene or polypropylene, polyamides like polyamide-6, polyamide-6.6, polyamide-4.10, polyamide-6.10, polyesters such as polyethylene terephthalate (PET) or polylactic acid (PLA), polyurethanes, polyacetal such as POM-H or POM-C, polyetherketone, polyetheretherketone, polyphenylene sulfide, polytetrafluoroethylene, polyvinylchloride, polycarbonates, polyimides or copolymers comprising two or more monomers of said polymers or blends of said polymers. Said materials may be provided as profiled sheets or as monolithic blocks with the alignment lanes being formed therein initially by forming the block or, after forming the block, by abrasive techniques such as carving, cutting, milling, grinding or any combination thereof.

Different parts of the alignment lanes may be made from different materials. In an embodiment, the part over the slot, which may be called the upper part of the alignment lane, may be made from a polymeric material such as a translucent, semi-transparent or transparent polymeric material while the part of the alignment lane under the slot, which may be called the lower part, may be made from stainless steel. The choice of different materials may be due to different functionalities of the different parts of the alignment lane. Hence it may be advantageous for optical inspection if the upper part is translucent while a lower part of stainless steel may be more durable or easier to clean.

In an embodiment, the surface of the alignment lanes is treated in such a way that sticking of items such as wet items sticking to surfaces for the formation of a liquid film to the surface is prevented. The surface treatment may be carried out by a coating showing either chemical properties such as hydrophobicity or hydrophilicity or macroscopic properties such as smoothness or roughness. The coating may be a lacquer or resin layer. The surface treatment may also be a macroscopic pattern or texture carved, cut, etched or pressed into the material of the alignment lane or any material covering the alignment lane. In an embodiment, the texture or pattern comprises straight or curved splines, nubs or dents or any combination thereof. In an embodiment, the alignment conveyor may comprise at least one means for enlightment. Said means for enlightment may be a light bulb, a light emitting diode or any other device emitting visible, infrared or ultraviolet light. The means for enlightment may also be any other source for electromagnetic radiation such as an X-ray tube, a gamma-ray source or a generator for micro- or radio waves. Throughout this application, the term "enlightment" means exposition of matter to any kind of electromagnetic radiation independent of whether it is typically called "light" or not. Electromagnetic radiation in this sense thus covers the whole electromagnetic spectrum such as radio waves, microwaves, infrared, visible and ultraviolet radiation as well as X-rays and gamma radiation. The means for enlightment may be installed at any position on the alignment conveyor. In an embodiment, the means for enlightment are positioned underneath or within the alignment lanes allowing for light to pass through the alignment lanes to enlight an elongated body passing through the alignment lane from the bottom. In an embodiment, the means for enlightment may be installed in such a way that they enlight the elongated body from the top. In an embodiment, the alignment lane comprises several means for enlightment that are mounted in such a way that they enlight the elongated body passing through the alignment lane from any direction and that formation of shadows of the elongated body on the alignment lane is prevented.

The at least one movable knife may vibrate, rotate or move in a translatory manner. Movement plane of the movable knife will always form an angle between essentially perpendicular and 10 degrees to the alignment direction. The knife may be of any shape and have a straight blade or a blade of curved shape. If the knife is rotatable, it may be mounted on an axis with the axis being perpendicular to the rotation plane of the motor.

The knife may have one or more blades. In an embodiment, the knife has two blades which may be oriented in one rotation plane in an angle of 180° to each other. In an embodiment, the knife has three blades which may be oriented in one rotation plane in an angle of 120° to each other. In an embodiment, the knife has four blades which may be oriented in one rotation plane in an angle of 90° to each other. In all said embodiments, the knife may look similar to a propeller with two, three or four blades, respectively. A symmetric arrangement of the blades is especially beneficial for high rotation rates of the knife as it allows for a more balanced rotation reducing wear on the motor and on gearing equipment. In an embodiment, the knife may be driven by a motor. In an embodiment, the knife is mounted directly to the motor through the axis. If the knife is connected directly to the motor through an axis, the motor is mounted perpendicular to the rotation axis of the knife. In an embodiment, the knife is connected to the motor through a gear, at least one axis or any combination thereof. If the knife is connected to the motor through a gear and an axis, the motor may not be perpendicular to the rotation plane of the knife. In an embodiment, more than one knife is connected to the motor.

The motor driving the knife may be a servo control motor. The motor driving the knife may be a linear motor. As the knife has to cut moving items the motor should provide a very high rotation rate. In an embodiment, the motor may have a rotation rate of up to 5000 rounds per minute (rpm). In an embodiment, the motor may have a rotation rate of up to 2500 rpm. In an embodiment, the motor may comprise a deceleration device. The movement speed of the elongated body to be cut through the alignment conveyor depends on the maximum start-stop frequency of the motor. In an embodiment, the motor can be started and stopped at maximum 50 times a second. In an embodiment, the motor can be started and stopped at maximum 40 times a second, 30 times a second, 20 times a second, 15 times a second, 13 times a second, 7 times a second or 5 times a second. Between start and stop, the motor may carry out one 360° rotation. Between start and stop the motor may carry out a rotation by 180°, 120° or 90°.

In an embodiment, the motor is controlled, started and stopped by the electronic circuit-based control device.

The motor and the axis may be mounted parallel or in an angle to the alignment direction. In an embodiment, the motor and the axis form an angle of at most 45° with the alignment direction. In an embodiment, the motor and the axis form an angle of at most 30° with the alignment direction. In an embodiment, the motor and the axis form an angle of at most 25° with the alignment direction. In an embodiment, the motor and the axis form an angle of at most 20° with the alignment direction. In an embodiment, the motor and the axis form an angle of at most 15° with the alignment direction. In an embodiment, the motor and the axis form an angle of at most 10° with the alignment direction.

The choice of the angle of the motor and the axis with the alignment direction may depend on the space requirement within the alignment conveyor where several alignment lanes may be combined with each alignment lane having an own motor and rotatory knife with their own space requirements. A mounting of the motor and the axis with an inclination to the alignment direction may allow for installation of several motors and several knifes in close proximity, e.g. in order to allow for a compact alignment conveyor with multiple lanes on a small surface area.

In an embodiment, the motor and the knife are mounted vibration isolated from the alignment lane. This means that any kind of vibration absorbing material is located in between the alignment lane and the motor. In an embodiment, the alignment lane and the motor are mounted on independent structures. In such case, the vibration absorbing material in between the alignment lane and the motor is the flooring material on the ground. In an embodiment, the motor and the alignment lane are connected via springs, or bulky elastic materials such as foams.

In an embodiment, the alignment lanes are sloped such that the elongated bodies are moving in a downward direction.

In an embodiment, the cross section of the alignment lanes perpendicular to the alignment direction is either U-shaped, V-shaped or trough-shaped. The shape of the cross section may vary along the alignment direction. Transitions of cross section shape may be sharp forming e.g. a step between a V-shape and an U-shape cross section or vice versa. Transitions of cross section shape may be smooth. Transitions of cross section shape may either be symmetric or non-symmetric. A non-symmetric transition of cross section shape between a V-shape and a U-shape or vice versa may have a special-shaped profile such as the form of a spiral segment or a helix segment and may thus allow to rotate a cuboid- or prismatic-shaped elongated body in a defined direction in order to allow for an optical inspection of the elongated body running through the alignment lane from all sides.

In an embodiment, the alignment lanes comprise an inlet which may be closed in order to prevent elongated bodies from entering the alignment lane for the reason of e.g. a defect.

The optical detection device may be at least one camera or any other detector for electromagnetic radiation. There is actually no limitation on the kind of camera or detector and thus, the camera may be a camera for visible, ultraviolet or infrared light. In an embodiment, the alignment conveyor may comprise more than one camera or detector for electromagnetic radiation mounted in different positions and/or angles along the alignment direction in order to allow for optical inspection of the elongated body running through the alignment lane from all sides.

In an embodiment, at least one detector for electromagnetic radiation is a detector for X-rays.

In an embodiment, the at least one camera or detector for electromagnetic radiation is connected to the electronic circuit-based control device. In an embodiment, the electronic circuit-based control device switches on and off the motor moving the rotating knife depending on the results of the optical inspection of the elongated body.

The alignment conveyor according to the application may be built up in a modular fashion. Alignment lanes may be single elements or more than one alignment lanes may form a building block wherein still each alignment lane comprises a slot and a movable knife. Single alignment lanes or building blocks of alignment lanes may be combined to a larger unit comprising a common feed of elongated bodies. Using single alignment lanes and/or building blocks the alignment conveyor may thus be constructed at any size depending on the needs of the user. An existing alignment conveyor in modular fashion may thus also easily be extended in case the need for capacity has increased. Furthermore, as every alignment lane works independently from the other alignment lanes, single alignment lanes may be deactivated e.g. for maintenance and a defect in a certain alignment lane does not necessitate to shut down the whole alignment conveyor as long as it is possible to close every alignment lane separately using a closable inlet. As the cutting process in every alignment lane is completely independent of the cutting process in the other alignment lanes, different alignment lanes or different groups of alignment lanes may be driven e.g. at different shaking frequencies and/or amplitudes if necessary.

Different alignment lanes in one alignment conveyor according to the application may be different in shape and/or size in order to be able to handle elongated bodies of a certain size. In case a water flow is used to transport elongated bodies through the alignment lanes, different alignment lanes in one alignment conveyor may have water flows of different speed and/or flow rate.

The application also pertains to a method for selectively cutting an elongated body one or more times using an alignment conveyor according to the application. Selective cutting according to the application means that cuts are applied at positions of the elongated body that have been selected applying fixed criteria which criteria might be defined by optical inspection of the elongated body prior to cutting. Optical inspection of the elongated body may identify a defect in the elongated body and thus lead to a movement of the movable knife which selectively cuts the elongated body apart in such a way that the elongated body is cut selectively at least two times—one time right before the defect and one time right after the defect leading to the elongated body being cut into at least three pieces wherein the defect is comprised either in one piece or in several pieces. In an embodiment, the pieces with defects are significantly smaller than the pieces without defects and may be sorted out after passage of the alignment conveyor using e.g. a sieve or any other sorting device. For sorting out pieces with defects the alignment conveyor according to the application may be combined with a sorter shaker comprising sieves which are shaken for easy separation of unwanted pieces.

Optical inspection of the elongated body moving along the alignment lanes may not only yield criteria for selective cutting but may also determine the actual speed at which the elongated body is moving which may be essential for control of the process. Due to the characteristics of the alignment conveyor according to the application, the elongated body may have any speed on the alignment lane. Speeds of elongated bodies on different alignment lanes and even speeds of different elongated bodies on the same alignment lane may be different as the speed of any elongated body is determined individually such that there is no necessity for synchronization of speed of either different elongated bodies or of the speed of the elongates bodies and the movable knife. The speed of elongated bodies on different alignment lanes may also be different. In general, the elongated bodes will move through the alignment lanes with a speed relative to the conveyor. This is different to transporting the elongated items on a conveyor belt where the elongated items do not move with a speed relative to the conveyor belt. In an embodiment, the elongated body is a French Fry, a parsnip, an aubergine, a carrot, a cucumber, a zucchini, a banana, an asparagus, a leek, a bean, a salsify root or any one of these or other vegetables cut into Julienne strips or any other kinds of pieces.

The application further pertains to the use of an alignment conveyor according to the application for the automatic removal of defects from either whole, peeled or cut vegetables or fruit such as French Fries, parsnips, aubergines, carrots, cucumbers, zucchinis, bananas, asparagus, leeks, beans, string beans or salsify roots.

The application further pertains to the use of an alignment conveyor according to the application for chopping elongated fruit or vegetables such as parsnips, aubergines, carrots, cucumbers, bananas, asparagus, leeks, beans, string beans or salsify roots.

According to the present application, "chopping" means that an elongated body is cut into pieces not according to criteria defined e.g. by optical inspection but with the goal of getting pieces of about the same size.

DESCRIPTION OF THE FIGURES

The following figures shows selected embodiments of the subject matter of the application. The present application should not be considered to be limited to the embodiments shown in the figures.

Figure 1:
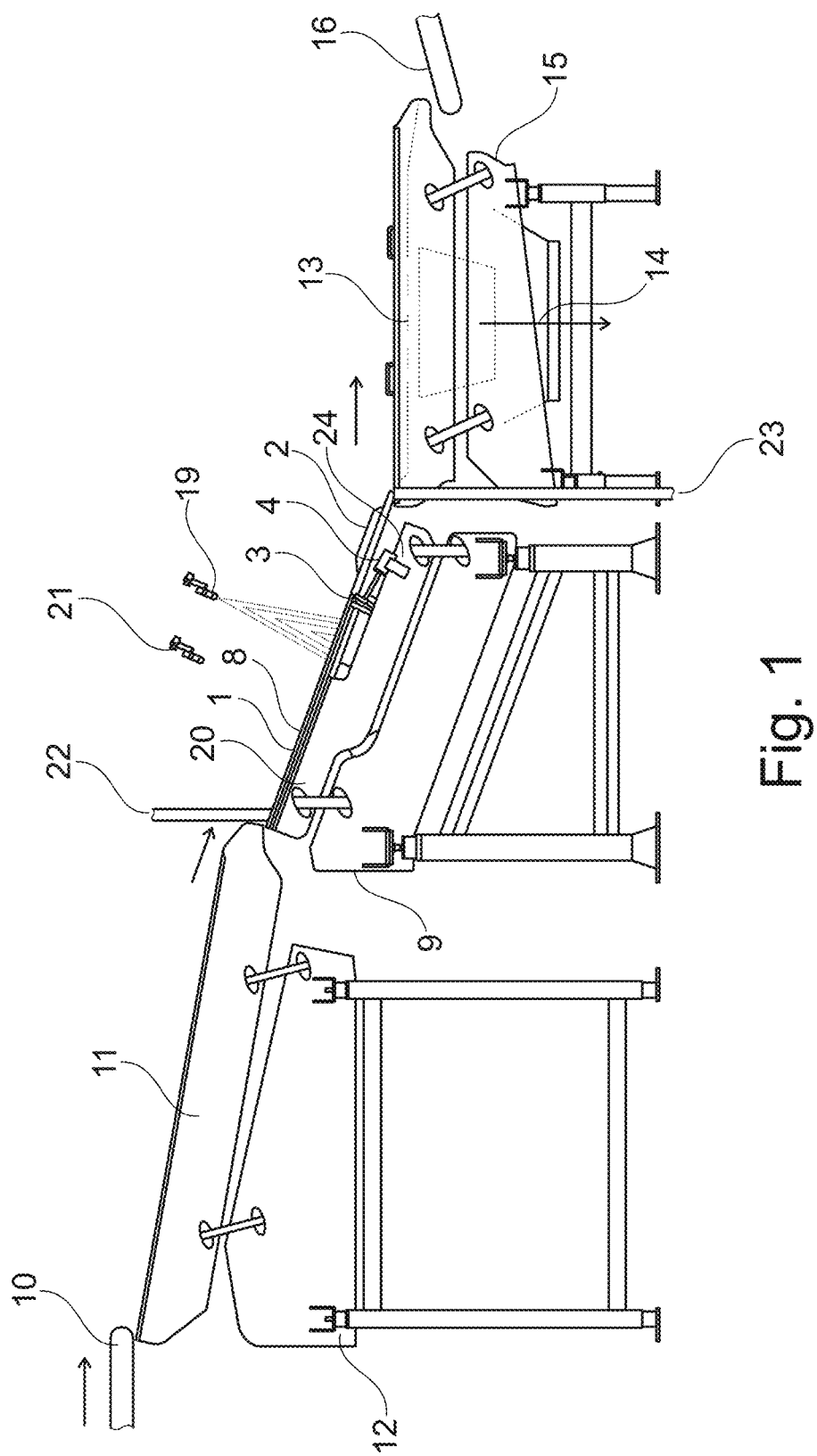
FIG. 1 is an overview picture of a whole machinery for automatic defect removal from French fries comprising an infeed conveyor 10 delivering the French fries to be processed. The French fries are put on an in-line shaker 11 mounted on a drive frame 12. The inline shaker brings the French fries in an orientation which is about parallel to the alignment direction. From the inline shaker, the French fries are moved to the alignment conveyor 20 according to the present application by a waterflow originating from the outlet 22. The alignment conveyor is mounted on a drive frame 9. The individual alignment lanes of the alignment conveyor are not visible in the side view of FIG. 1. The upper part 1 of the alignment conveyor 20 is made from a polymeric material and may have a special shaped profile 8 which may cause the French fries to rotate. While sliding over the alignment conveyor 20, the French fries are enlightened by a source of electromagnetic radiation 21 and inspected by a camera system 19.

After having passed the camera system 19, the French fries pass by a knife 3 which is connected to a motor 4. The motor 4 is connected to the drive frame 9 by a vibration-absorbing material 24. The lower part of the alignment conveyor 2 is made from stainless steel and comprises a drainage system 23 through which the water flow leaves the alignment conveyor.

After leaving the alignment conveyor the French fries as well as pieces cut therefrom are released to a sorter shaker 13 which is mounted on a drive frame 15 and which may be equipped with sieves sorting out small pieces of removed defects which may be released 14 from the sorter shaker 13. From the sort shaker 13 the French fries are released to a product conveyor 16.

Figure 2:
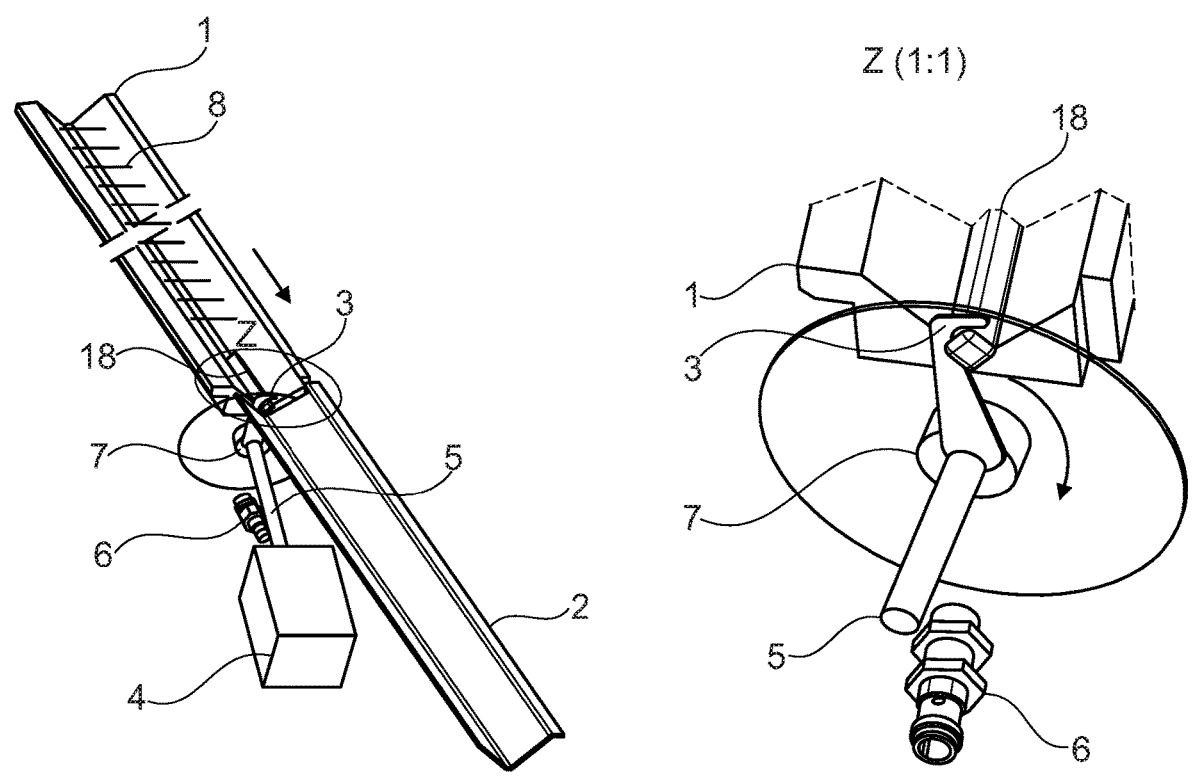

FIG. 2 is a detailed view of one alignment lane of the alignment conveyor according to the application comprising an upper part 1 made of plastic and a lower part 2 made from stainless steel and a French fry 18 sliding over the upper part 1. Between the upper and the lower part of the alignment conveyor, a knife 3 is mounted on a knife mount 7 and connected to a motor 4 by a drive axis 5. The motor is triggered by a sensor 6.

Figure 3:
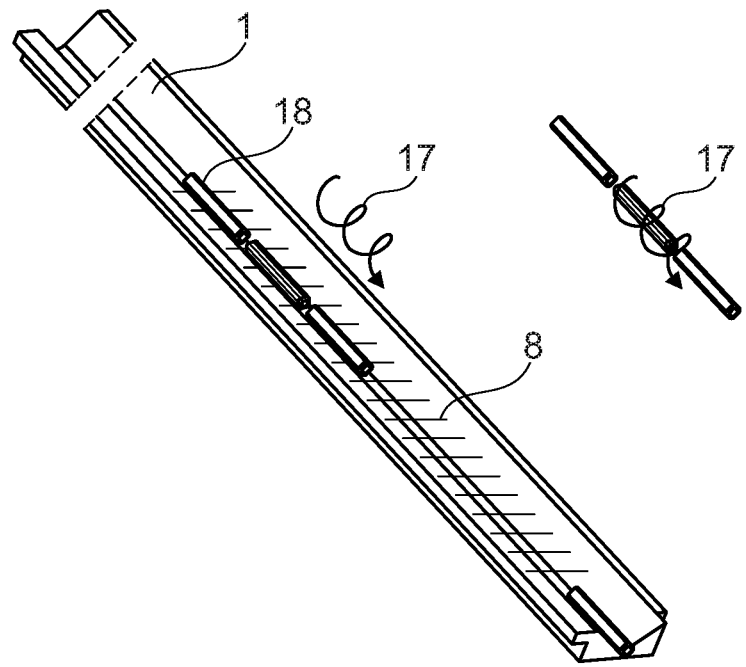
Figure 3:
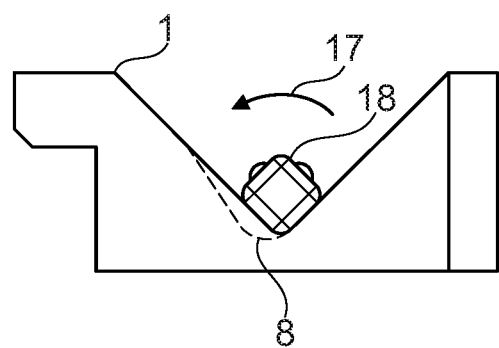

FIG. 3 shows a further detailed view of an alignment lane of the alignment conveyor with French fries 18 sliding down the alignment lane which are put into rotation 17 around their length axis. Rotation is achieved by a special shaped profile 8 of the alignment lane. The cross section of the alignment lane of FIG. 3 has V-shape, however the special shaped profile 8 leads to an asymmetric deviation from the V-shape putting the French fry into rotation in a predefined direction.

Figure 4:
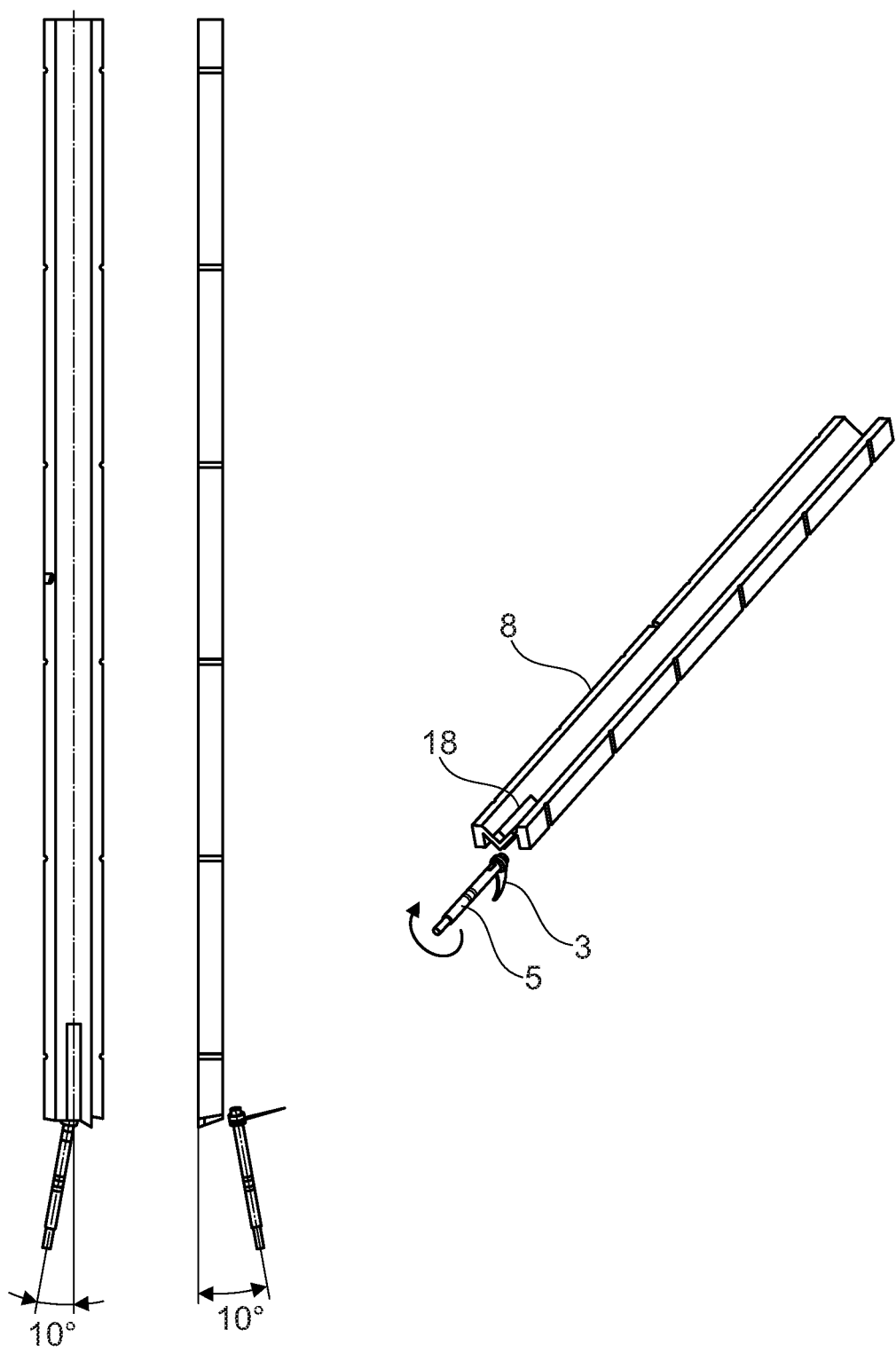

FIG. 4 shows a further embodiment of the alignment lane according to the application. Said alignment lane is based on an M-shaped profile 8 with a French fry 18 sliding down said profile. In front of the alignment lane, a knife 3 with a drive axis 5 is mounted.

The invention claimed is:

1. An alignment conveyor suitable for elongated bodies comprising
    at least one piece of material comprising an indentation in an alignment direction as an alignment lane,
    which alignment lane comprises at least one slot in the alignment lane in an angle to the alignment direction,
    at least one means for optical detection for determining the speed of the elongated body on the alignment conveyor,
    at least one electronic circuit-based control device,
    at least one movable knife mounted shifted from the means for optical detection in the alignment direction, mounted in an angle to the alignment direction and mounted in such a way that it can move within the slot in the alignment lane and wherein
    that the at least one alignment lane is sloped.

2. The alignment conveyor according to claim 1 wherein the alignment conveyor comprises a means to vibrate the at least one alignment lane.

3. The alignment conveyor of claim 1 wherein the alignment lanes comprise a water outlet at or close to its top end and a drainage connected to its bottom end for transporting the elongated bodies through the alignment lanes by a water flow.

4. The alignment conveyor of claim 1 wherein the slot is formed like a step.

5. The alignment conveyor of claim 1 wherein the alignment lane or a part thereof is of a material which shows a specular reflection that is negligible compared to its diffuse reflection.

6. The alignment conveyor of claim 1 comprising at least one source of electromagnetic radiation.

7. The alignment conveyor of claim 1 wherein the movable knife is rotating.

8. The alignment conveyor of claim 1 wherein the slot forms an angle between 45° and 90° with the alignment direction.

9. The alignment conveyor of claim 1 wherein the movable knife and the alignment lane are connected via a vibration-absorbing material.

10. The alignment conveyor of claim 1 wherein the at least one optical detection device is at least one camera connected to the electronic circuit-based control device.

11. The alignment conveyor of claim 1 wherein at least a part of the at least one alignment lane is U-shaped, V-shaped or trough-shaped and/or wherein different parts of an individual lane have different shapes with either symmetric or non-symmetric transitions between the different shapes.

12. A method for selectively cutting an elongated body one or more times using an alignment conveyor of claim 1.

13. The method of claim 12 wherein the elongated body is a French Fry, a potato, a sweet potato, a carrot, a cucumber, a zucchini, a banana, an asparagus, a salsify root or any one of these or other vegetables cut into Julienne strips.

14. The method of claim 12 wherein the elongated body is rotated on the alignment conveyor by 360 degrees by a profile on the alignment lane.

15. Use of the alignment conveyor of claim 1 for the automatic removal of defects from either whole, peeled or cut vegetables or fruit comprising French Fries, carrots, cucumbers, zucchinis, bananas, beans, asparagus or salsify roots by identifying a defect by optical inspection which leads to a movement of a movable knife which selectively cuts the French Fries, carrots, cucumbers, zucchinis, bananas, beans, asparagus or salsify roots apart in such a way that the French Fries, carrots, cucumbers, zucchinis, bananas, beans, asparagus or salsify roots are cut selectively at least one time before the defect and one time after the defect leading to the French Fries, carrots, cucumbers, zucchinis, bananas, beans, asparagus or salsify roots being cut into at least three pieces wherein the defect is comprised either in one piece or in several pieces or by chopping thereof.

\* \* \* \* \*